United States Patent [19]
Itter et al.

[11] 3,727,767
[45] Apr. 17, 1973

[54] DOUBLE FILTER UNIT

[75] Inventors: Friedhelm Itter; Max Feth, both of Remscheid; Gerd Zimmerbeutel, Huckeswagen, all of Germany

[73] Assignee: Barmag Barmer Aktiengesellschaft, Wuppertal, Germany

[22] Filed: Oct. 7, 1971

[21] Appl. No.: 187,457

[52] U.S. Cl. .................................. 210/247, 210/341
[51] Int. Cl. .............................................. B01d 35/12
[58] Field of Search ...................... 210/247, 340, 341

[56] References Cited

UNITED STATES PATENTS 1,189,566  7/1916  Hauer .............................. 210/340 X
3,056,499  10/1962  Liddell ............................ 210/247 X Primary Examiner—Frank A. Spear, Jr.
Attorney—Johnston, Root, O'Keeffe, Keil, Thompson & Shurtleff

[57] ABSTRACT

Double filter unit embodying two parallel filter pots with replaceable filters, two bars intersecting and connecting the filter pots, a loop passage in each bar, an inlet pipe on one bar, an outlet pipe on the other bar, and valved ports in each bar connecting the loop passages with the inlet and outlet passages of respective filter pots for selective closing off during filter change or cleaning.

15 Claims, 7 Drawing Figures

DOUBLE FILTER UNIT

The invention relates to a unit for filtering liquids of high viscosity, especially thermoplastic polymer melts. It may be connected with an extrusion press. The unit has a casing with central inlet and outlet pipes, a branch passage between inlet and outlet pipes and at least two removable filter units connected in parallel in the branch passage. Each filter unit has a filter pot with a gas vent line plus associated inlet-side and outlet-side shut off valves.

Such a double filter arrangement serves the purpose of removing one filter and cleaning or replacing it while the other filter is in operation. Melt flow is not interrupted, and during and after the filter changing operation, there is no quality alteration in the production of extruded polymer. For this purpose the branch passage in the zone of the filter to be changed is blocked off by the corresponding shut off valve. Before returning the cleaned or replaced filter to operation, the air, gas or like situated in the shut down part of the branch passage is removed through a vent line provided in the zone of this filter.

In a known double filter device (British Pat. No. 1,168,063) there are provided as inlet-side and outlet-side shut off valves in both parts of a branch passage two respective shut-off stopcocks or rotary slide valves. In the passage section between the inlet side and the outlet-side shut off valves there is in the casing a chamber containing a removable filter pot with a removable filter.

By reason of the passage arrangement and valve construction chosen, this known device presents substantial disadvantages which are associated causally with the filter change. Shut-off stopcocks, rotary valves or the like rotated valve bodies block off the flow channel in closing position by a part of the surface of the rotated body. Melt flow is blocked completely, and a so-called standing melt forms in the passage sections ahead of the closed valves. This melt accumulates on the passage walls, on the blocking surface of the valve and in the corners between wall of the passage or valve body and the blocking surface and in the passage bore of the shut off valve. Such standing melt cannot be removed during and after the filter cleaning.

The melt residues of standing melt that have hardened during the filter change form, on the one hand, unfavorable flow resistances, through which, after a relatively long period of operation, the free passage cross sections are reduced in size. On the other hand, melt residues which accumulate on the valve seats can seriously impair the functioning of the valves.

In another known double filter device (German published application No. 1,131,875) which is comparable in construction and functioning with the aforementioned known filter device, shut off valves are arranged in the partial channels of the branch passage. The valves are longitudinal slide valves, and interact in valve-longitudinal-direction in each case with an annular valve seat formed in the branch passage.

By reason of the chosen passage and valve arrangement, standing melt also forms in the valve closing position in the zone of the valve blocking surface, where flow dead zones are present. Here, too, the accumulated melt residues cannot be removed during and after the filter cleaning.

In the known forms, casings are one piece units. This is disadvantageous inasmuch as the passage section which is blocked during the filter change and the filter chamber formed in the casing are poorly accessible from outside and therefore are complicated to clean and cannot be cleaned sufficiently well.

It is an aim of the invention, with retention of the central inlet and outlet pipes of the filtering device, of the parallel arrangement of the double filter as well as of the number of shut off valves to redesign and to arrange the branch passage and the valves in such a way that, during the filter change, there is present a constant liquid or melt circulation across the closed shut off valves, whereby no standing melt cam form.

It is a further aim of the invention to re-form the branch passage in such a way that, during the filter change, there is a minimum portion of the passage in which melt flow is blocked and which, when the filter unit is removed, is easily accessible and thereby simple to clean. All the other parts of the shut down portion situated between inlet-side and outlet-side shut off valves, which comprise the filter pot, the filter arranged in it and the associated passage-containing components thereof, can be changed and by reason of their favorable construction can be taken apart and easily cleaned.

Finally, the particular advantage of the known double filters is preserved, viz., that production does not have to be interrupted during the filter change. Moreover, the melt, upon return to operation again of a removed and cleaned filter, is conducted with constant quality through the unit.

These various aims are achieved in the filter unit of the type described above, according to the invention herein, by making the branch passage for the inlet-side of the unit a loop passage connected in common with the inlet valves of the filters and for the outlet-side of the unit another loop passage connected in common with the outlet valves of the filters. The loop passages have laterally connected tap passages, and the filter pots each are provided with a sealed inlet opening and outlet opening detachably connected with the laterally connected tap lines.

Through this arrangement there are achieved during the filter change essentially two objectives. First, the liquid of high viscosity circulating constantly through the loop passages, especially melts of thermoplastic materials, flow across the closed valves during the filter change. There no longer are present passage portions forming dead zones. The valve heads as well as the valve seats are situated in the laterally connected tap lines, so that no standing melt can form. In the second place, the branch passage is subdivided in such a way that one section serves as a short supply line to the active filter while the remaining sections serve as a secondary supply line to the active filter. In this manner, no standing melt can form during the filter change. Furthermore, the filter parts located in the shut down section can be disassembled simply and thoroughly cleaned. The short tap lines are efficiently freed of the residual melt by the closing of the valves having on the valve heads passage-clearing extensions whereby no standing melt can remain standing in the short tap lines.

A preferred form of the device according to the invention is characterized by filter pots mounted in casing units by suitable pressure applying means to firmly but releaseably connect and seal the melt flow passages of the filter unit with the short tap lines. Through the pressure applying means arranged between the casing and filter pot, a rapid and simple connection or detachment of the filter pots with the casing is made possible. Furthermore, as already mentioned above, the several and separable components of the filter units are readily produced and assembled.

Another feature of the invention resides in connection of the filter casing units with one another by separate, preferably bar-form members containing the loop passages. In a preferred form of the invention the loop passages and the tap lines thereof are bores in bars or blocks extending between filter units.

In the embodiments utilizing the bars or blocks, the loop passages, the connected tap lines and the valve seats in their finished state are readily assembled with the required shut off valves. Furthermore, the bar or block components have the advantage of low production costs.

A further feature of the device of the invention resides in providing the pot inlet and pot outlet openings with a respective packing or seal between said openings and an inlet and outlet passage, respectively, in the filter pot. This special feature makes possible the rapid changing of individual filter units.

So that these points can be sufficiently taken into consideration, the removable parts of the filter unit itself, according to another feature of the invention, include as components of the filter pot a cover or cap and a base. The filter inside the chamber is between these and is interposed between the inlet and outlet passages. The filter, according to a further feature of the invention, consists of a hollow supporting body closed on inlet side, with transverse bores in its body wall, and filter screens surrounding it. In particular, the supporting body as well as the filter screens are hollow cylinders, forms which are especially simple to manufacture.

The supporting body, further, is expediently provided with a flange which facilitates considerably its installation between the base and cover or cap of the filter pot. Furthermore, from the viewpoint of flow technology it is especially desirable to provide in the supporting body an expeller core.

Preferably, the hollow base of the filter pot, the supporting body with its flange and the cover or cap of the filter pot are axially fitted together and detachably joined by fastening means.

By reason of the preferred flanged construction, the individual pot and filter parts, which include the hollow base of the pot, the supporting body with its flange, the cap or cover of the pot, the expeller core and the filter screens, can be exactly and easily assembled. This unit, when disassembled into its individual parts, can be cleaned thoroughly. The flange construction further provides upon assembly an annular passage or space between the filter pot and the filter body proper, also called the outer filter chamber, and an inner filter chamber.

By reason of the several component construction of the filter pot, aside from the inlet and outlet openings, the unit is closed on all sides with the supporting body and the filter screens suspended therein. In the preferred suspended arrangement of supporting body and filter screens plus the expeller core, the liquid of high viscosity, especially the melt of thermoplastic materials, flows around, rising from below all sides, a filter body having a relatively large filtering area. In this manner, high filter performance is realized.

Preferably vent lines are connected to the annular passage and to the outlet passage in the cover or cap. One or the other may be connected with a melt filling container or an evacuation device. Both vent lines can be connected with an evacuation device. For slow and bubble-free filling of the cleaned filter which is ready for operation, however, there can also be used as an aid a melt container which is connected to the vent line of the outlet passage. When the vent lines are open, accordingly, the filter and filter pot can be filled and made ready for operation free of air and bubbles.

Finally, it is especially advantageous to have the components provided with the loop passages, the tap lines and inlet or outlet valves positioned on one side of the casings.

A preferred embodiment of the invention is represented in the drawing, wherein.

Figure 1:
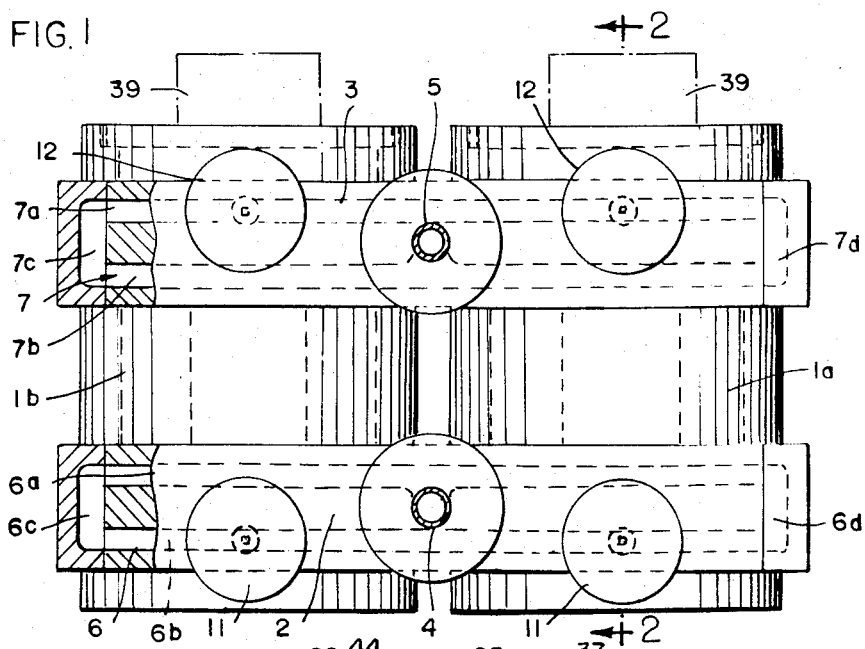
FIG. 1 is a front elevation, partly in section, of the double filter unit.
Figure 2:
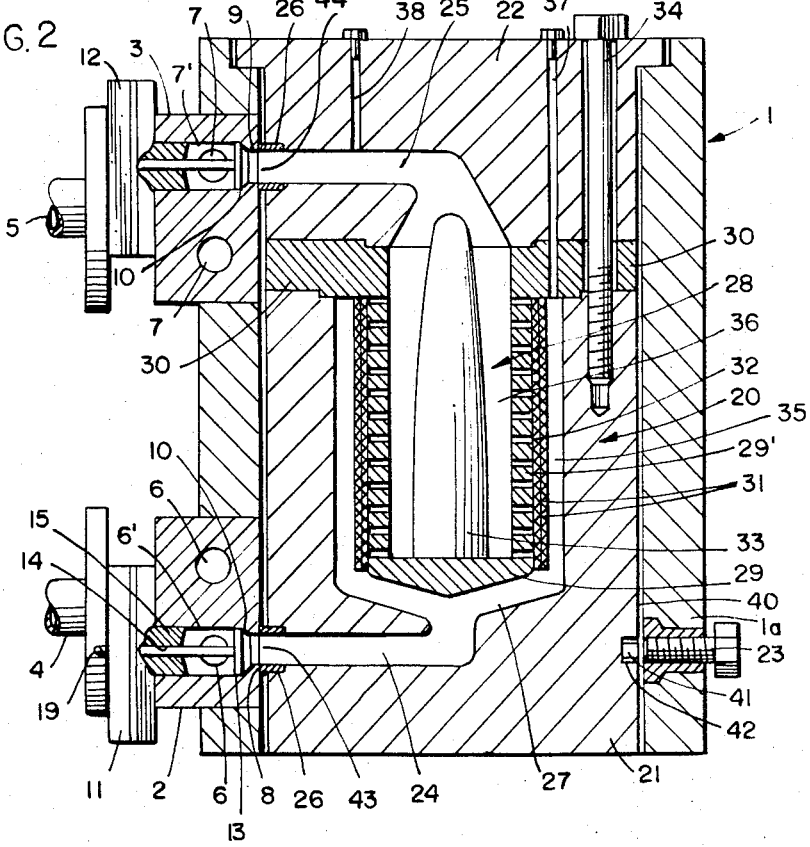
FIG. 2 is a section view on section plane 2—2 of FIG. 1.
Figure 3:
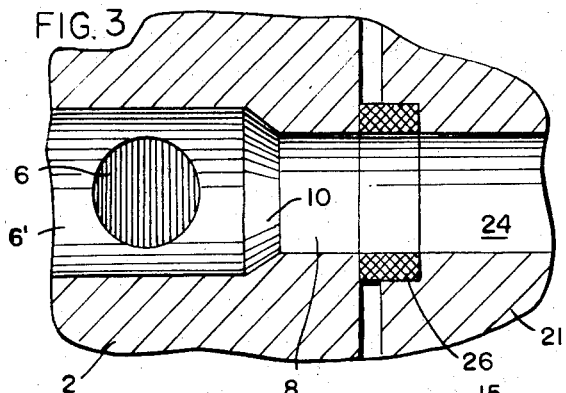
FIG. 3 is a fragmentary, cross section, detail view of the passage joint between the loop passage and its tap line and the inlet passage of the filter pot.
Figure 4:
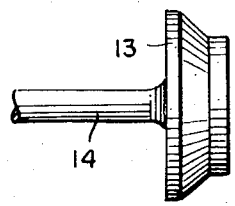
FIG. 4 is a side elevation of the head and stem of a shut off valve.
Figure 5:
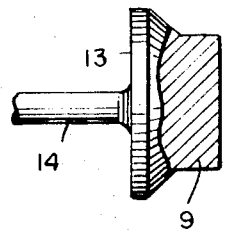
FIG. 5 is a side elevation, partly in section, of the head and stem of a bore-cleaning shut off valve.
Figure 6:
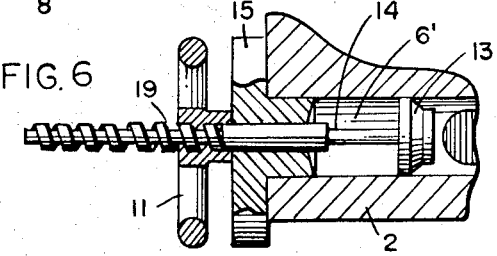
FIG. 6 is a fragmentary cross section, detail view of the shut off valve in open position.
Figure 7:
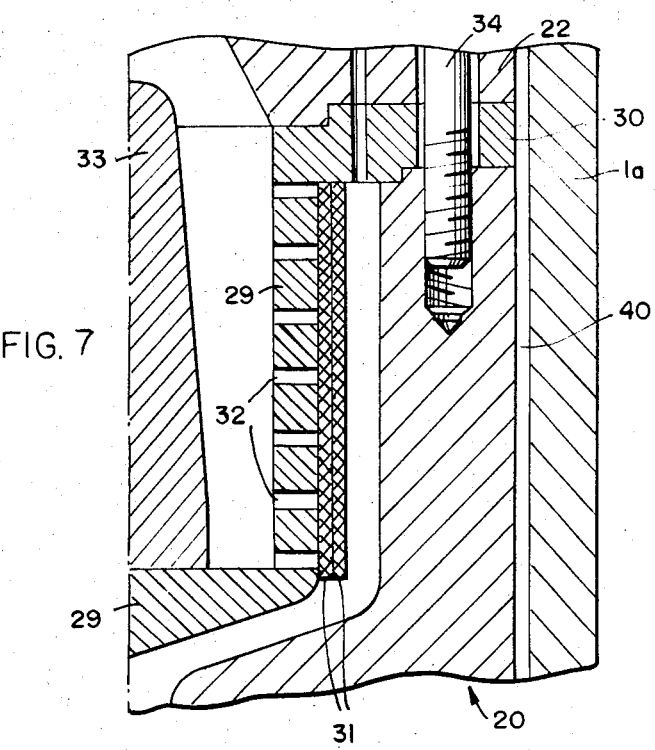
FIG. 7 is a fragmentary, cross section, detail view of the filter unit on a radial plane thereof.

The filter unit 1 consists essentially of two hollow, preferably cylindrical casings 1a and 1b. These two casings are connected with one another by cross-members, preferably in the form of bars or blocks 2 and 3, to form a composite filter unit. The central melt inlet pipe 4 is connected to the bar 2 and the central melt outlet pipe 5 is connected to the bar 3. The two bars 2 and 3 have respective loop passages 6 and 7, each having two lateral tap lines 8.

The loop passages comprise longitudinal passages 6a and 6b connected by cross passages 6c and 6d in the bar 2 and corresponding passages 7a to 7d in the bar 3. In each tap line 8 there is a valve seat 10. Shut off valves 11 and 12, which respectively are inlet and outlet valves, are mounted in cross bores 6' and 7' in the bars 2 and 3.

Each valve consists, for example, of a valve head 13, a valve stem 14 with a threaded spindle 19, a plug 15 with packing seal, and a valve handle or wheel 16 threadedly coupled to outer end of the spindle 19. The cylindrical extension 9 clears the tap line 8 of melt when the valve is closed.

The valves 11 and 12 are oriented transversely to the loop passages 6 and 7, namely, transversely to and intersecting the longitudinal axis of passages 6b and 7a. In the valve closing position the valve heads 13 are in the tap lines 8 with valve seats 10 to one side of the passages 6b and 7a. The melt circulating constantly in the loop passages 6 and 7 flows over the inner face of the valve head. The stem 14 of the valves extends transversely across the passage and is washed by the circulating melt.

In the casings 1a and 1b there are mounted the filter pots 20, consisting each of a preferably cylindrical cap or cover 22 and a preferably cylindrical, hollow base 21. They are mounted in the casings 1a and 1b by screws or bolts 23. Each filter pot 20 has an entry passage 24 and an outlet passage 25, respectively in the form of bores in the bottom of the base 21 and in the cap or cover 22. The inlet and outlet openings 43 and 44 of each passage have a sealing ring 26.

The interior of the base 21 comprises a cylindrical chamber 27, in which there is positioned the filter 28. The filter 28 consists essentially of a hollow, preferably cylindrical supporting body 29 closed on inlet side, a flange 30 and the filter screens 31. In the cylindrical wall 29' of the supporting body there are transverse bores 32. In the interior of the supporting body, an expeller core 33 preferably is provided.

The supporting body 29 and also the expeller core 33 are positioned in the filter pot in such a way that there are formed free melt flow spaces, namely, the outer, annular, filter chamber 35 and the inner filter chamber 36. The outer filter chamber 35 preferably has a closable vent line 37. A further closable vent line 38 is connected to the outlet passage 25. The latter can communicate with a melt container 39 (indicated in dot-and-dash lines in FIG. 1). This container is used merely for the purpose of filling the cleaned filter with melt when it is returned to operation.

The removable filter unit, which consists essentially of the filter pot 20 and the filter 28, has an annular clearance or gap 40 in the casing 1a or 1b. The screws or bolts 23 which hold the filter unit in fixed position in the casing preferably have pin 41 which enters a corresponding recess 42 in the filter pot. The tightened screws or bolts 23 exert a force which works between the casing and pot as spreading force and which serves simultaneously as a pressing force for the establishing of the sealed connection between openings 43 and 44 and the tap lines 8. The pressure screws are mounted at spaced intervals in the side of the casing opposite to the sealing rings 26.

The high viscosity liquid flowing into the central inlet pipe 4 flows through the loop passage 6. From here it flows through one of the open inlet valves 11 to the filter which is in operation. Simultaneously the stem and rear face of the head of the closed valve is washed by the melt circulating in the loop passage 6. In this manner, standing melt cannot form either in the loop passage or in the zone of the closed valve. The same relations are present simultaneously in the loop passage 7 which is connected to the central outlet pipe 5.

The filter pot 20 and the filter 28, which are removed together for the purpose of cleaning, are separated into the several individual components, inclusive of the inlet-side and outlet-side seal rings 26. They are thereby easily accessible and can be cleaned both simply and thoroughly. The remaining passages which likewise have to be cleaned are only the short bore sections of the tap lines 8, which are easily accessible from outside and are therefore easy to clean. Preferably, they are cleaned by the cylindrical extensions 9 of the valve heads 13.

In order to put the filter in operation again, it is filled, after installation, slowly with melt. So that the air can escape from the blocked off section of the apparatus, the vent lines 37 and 38 are opened. If there is connected to the vent lines a melt container 39 which is arranged on the filter pot, then, via this melt container, melt is filled into the filter pot until no air bubbles are present. It is also possible to use an evacuation device (not represented), which is connected to the vent lines 37 and/or 38, to remove air as the filter pot fills with melt supplied from the bottom through passage 24.

After completion of the filling process, the vent lines 37 and 38 are closed and the inlet and outlet valves 11 and 12, which belong to the cleaned filter, are opened. The switch-over operation on the double filter device is completed when inlet valve and outlet valve of the other filter, now to be cleaned, are closed.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A device for filtering liquids of high viscosity, particularly melts of thermoplastic synthetic polymers which comprises a filter unit having an inlet pipe and an outlet pipe, two parallel filter casings, a removable filter pot mounted in each casing, each filter pot having an inlet passage and an outlet passage, connecting means joining said casings and containing branch passages, said branch passages being loop passages connected by tap lines with respective inlet and outlet passages of said filter pots, valve seats in said tap lines, shut off valves for respective valve seats for selectively opening and closing liquid flow between said loop passages and said filter pots, and means sealing the connections between respective tap lines and the inlet and outlet passages of the respective filter pots.

2. A device as claimed in claim 1, and pressure-exerting mounting means mounting respective filter pots in said casings and simultaneously pressing said sealing means to provide a fluid-tight joint.

3. A device as claimed in claim 1, said connecting means being a pair of bars extending between said casings.

4. A device as claimed in claim 3, said loop passages comprising longitudinal bores in said bars, and said tap lines being bores intersecting said longitudinal bores.

5. A device as claimed in claim 1, said sealing means being a sealing ring mounted in the respective inlet and outlet openings of said filter pots.

6. A device as claimed in claim 1, each filter pot comprising a hollow base and a cap or cover defining an enclosed filter chamber, and a filter member mounted in said chamber.

7. A device as claimed in claim 6, said filter comprising a hollow supporting body closed at its inlet side, transverse passages through the side of said supporting body and one or more filter screens supporting said body and covering said bores.

8. A device as claimed in claim 7, said supporting body being a hollow cylinder and said filter screen or screens being hollow cylinders fitted about said supporting body.

9. A device as claimed in claim 8, and an annular flange on said supporting body.

10. A device as claimed in claim 9, said flange being positioned between said hollow base and said cap or cover, and removable fastening means holding said hollow base, said annular flange and said cap or cover together.

11. A device as claimed in claim 10, said supporting body being suspended in said chamber of said filter unit by said annular flange.

12. A device as claimed in claim 7, and an expeller core within said supporting body.

13. A device as claimed in claim 1, and gas vent lines intersecting the outlet passage of said filter pot and also the space between the filter screen and the wall of said chamber.

14. A device as claimed in claim 1, said connecting means comprising two members positioned on the same side of respective casings.

15. A device as claimed in claim 1, said valves having respective valve chambers extending transversely across the loop passages, valve heads of said valves having only their rear faces exposed to melt flowing through said annular passages and valve chambers when said valves are closed, and the valve stems thereof extending axially through said valve chambers, said stems being washed with liquid flowing through said loop passages and valve chambers when the valve is in closed position.

* * * * *